(12) United States Patent
Cornillat et al.

(10) Patent No.: US 6,285,882 B1
(45) Date of Patent: Sep. 4, 2001

(54) REREGISTRATION OF NETWORK UNITS

(75) Inventors: Pierre Cornillat, Chandler, AZ (US); Tamal Islam, Gaithersburg, MD (US)

(73) Assignee: Iridium IP LLC, Washington, DC (US)

( * ) Notice: Subject to any disclaimer, the term of this patent is extended or adjusted under 35 U.S.C. 154(b) by 0 days.

(21) Appl. No.: 09/233,315

(22) Filed: Jan. 19, 1999

(51) Int. Cl.$^7$ ................................................. H04Q 7/20
(52) U.S. Cl. .................................. 455/435; 455/411
(58) Field of Search ............................. 455/435, 411, 455/456, 433, 432

(56) References Cited

U.S. PATENT DOCUMENTS

| | | | |
|---|---|---|---|
| 5,519,706 | * | 5/1996 | Bantz .................................. 370/85.3 |
| 6,078,811 | * | 6/2000 | Lin ....................................... 455/433 |
| 6,137,791 | * | 10/2000 | Frid ...................................... 370/352 |

* cited by examiner

Primary Examiner—Vivian Chang
Assistant Examiner—James K. Moore
(74) Attorney, Agent, or Firm—Pepper Hamilton, LLP

(57) ABSTRACT

The present invention provides a method and system for reregistration of a subscriber unit in a global telecommunications network. The method and system includes receiving an event requiring authentication; determining if a threshold for subscriber verification has been reached; requesting subscriber verification if the threshold has been reached; and deregistering the subscriber if the subscriber is not verified. The method and system of the present invention prevents continued access to the network by deregistered subscribers for cross-protocol calls when deregistration messages are lost. In this manner, fraudulent use of the network by unauthorized users is decreased.

17 Claims, 11 Drawing Sheets

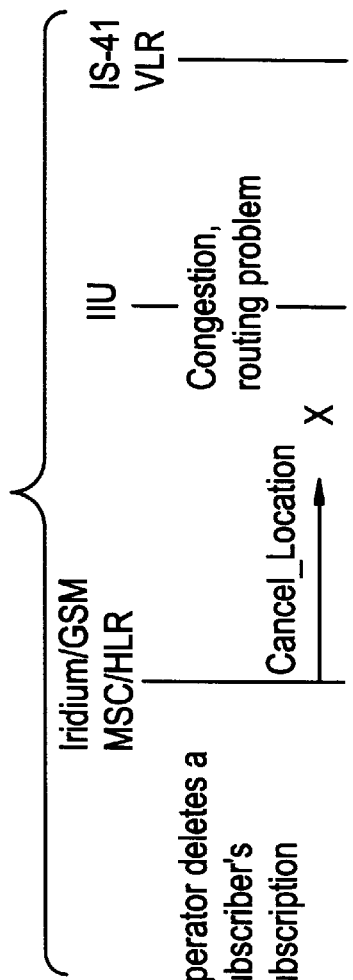
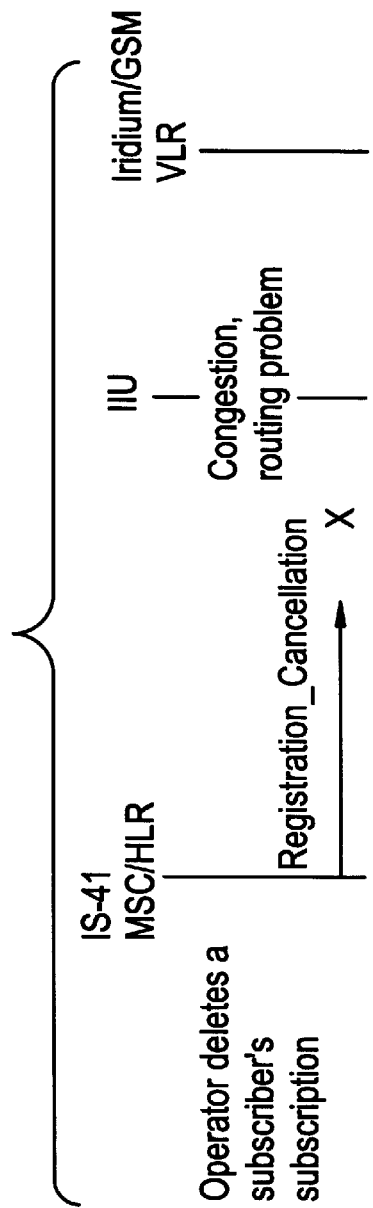

Message Flow for the
Iridium/GSM-homed Case

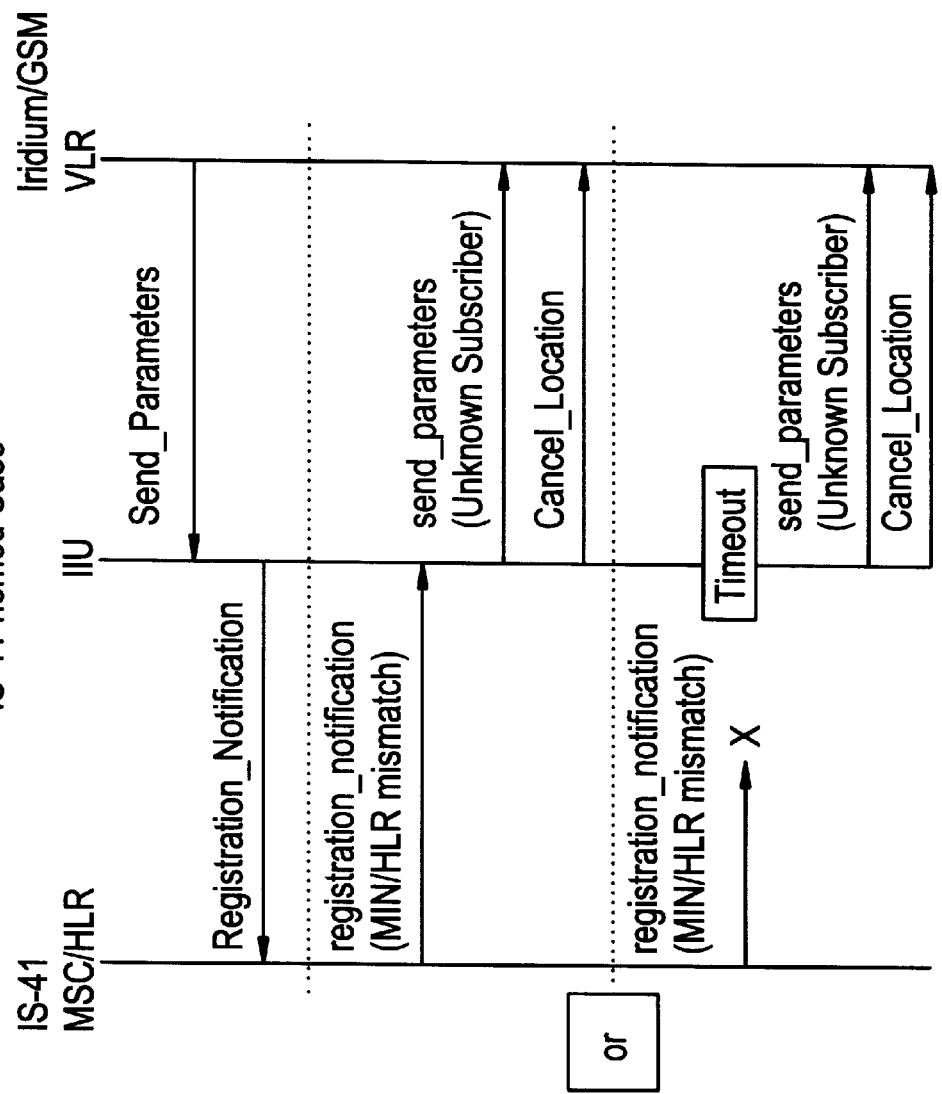

US 6,285,882 B1

REREGISTRATION OF NETWORK UNITS

FIELD OF THE INVENTION

The present invention relates to telecommunications networks, and in particular to the reregistration of network units for fraud prevention in a global telecommunications network.

BACKGROUND OF THE INVENTION

With the development of a global economy, business persons who regularly travel to other countries are a fast growing breed. To meet their needs, satellite-based global telecommunications networks are being developed. The first such network was commercially activated by Iridium LLC on Nov. 1, 1998. These networks provide international cellular/satellite phone and paging services. Such networks inevitably involve numerous entities in many different countries which work together as part of the network. Such entities involve governments, service providers, industry clearinghouses, and others from around the world. Each call made through the network often involve numerous entities and often cross national sovereignty lines.

As calls cross sovereignty lines, they often also pass from a jurisdiction using one communications protocol into another jurisdiction using a different communications protocol. This presents a problem when a subscriber is to be barred or deregistered from further access to the network due to unpaid bills, lost phones, etc. A message is sent through the network to deregister the subscriber. However, this message may be lost due to congestion or message routing problems. If this happens, then the subscriber is never deregistered and the subscriber can continue to use the network.

Accordingly, there exists a need for a method of ensuring proper deregistration of a network subscriber for cross-protocol calls in a global telecommunications network. The present invention addresses such a need.

SUMMARY OF THE INVENTION

The present invention provides a method and system for reregistration of a subscriber unit in a global telecommunications network. The method and system includes receiving an event requiring authentication; determining if a threshold for subscriber verification has been reached; requesting subscriber verification if the threshold has been reached; and deregistering the subscriber if the subscriber is not verified. The method and system of the present invention prevents continued access to the network by deregistered subscribers for cross-protocol calls when deregistration messages are lost. In this manner, fraudulent use of the network by unauthorized users is decreased.

BRIEF DESCRIPTION OF THE FIGURES

FIG. 6 is a message flow diagram for a GSM-homed subscriber roaming in an IS-41 protocol jurisdiction.

FIG. 7 is a message flow diagram for an IS-41 homed subscriber roaming in a GSM protocol jurisdiction.

FIG. 11 is a message flow diagram for the reregistration of an IS-41 homed subscriber in accordance with the present invention.

DETAILED DESCRIPTION

The present invention provides a method and system for proper deregistration of a network subscriber for cross-protocol calls in a global telecommunications network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 11 in conjunction with the discussion below.

To understand the method for handling calls to a network subscriber while the subscriber roams in a global telecommunications network in which the caller completely pays for the cost of the call, first the preferred embodiment of the telecommunications system which may use the present invention needs to be described.

Figure 1:
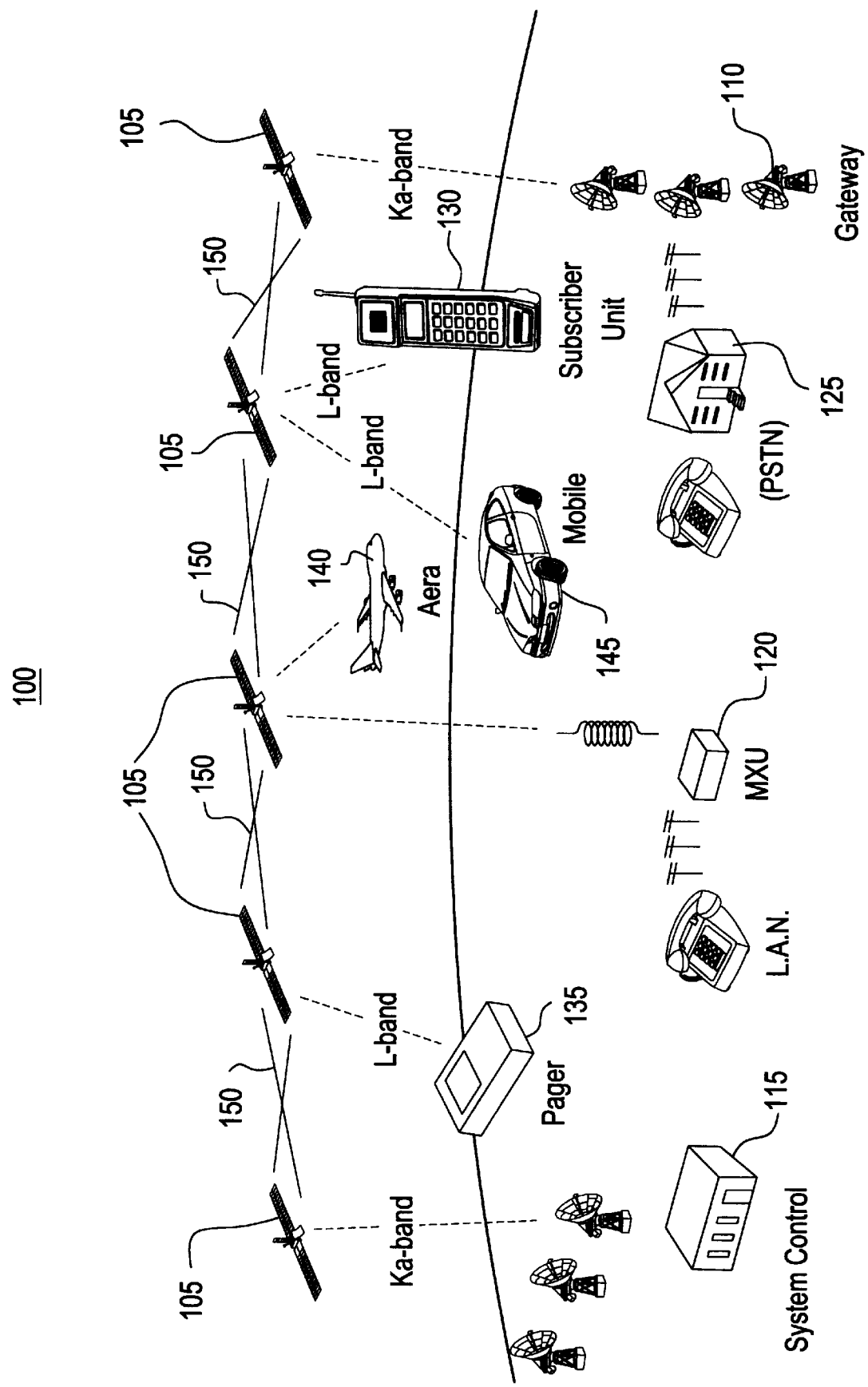
FIG. 1 illustrates a global telecommunications network which may use the present invention.

FIG. 1 illustrates a telecommunications system which may be used with the present invention. The system 100 includes low earth orbiting satellites 105, gateways 110, system control 115, and Mobile Exchange Units 120 MXU). System Control 115 serves as the central management component for the system 100. Gateways 110 interconnect the satellite constellation 105 with public switched telephone networks 125 (PSTN), making communication possible between system subscriber units 130 and any other telephone in the world. The MXU 120 provide access to the system 100 at remote locations. Telecommunications services may also be provided to pagers 135, aircraft 140, and automobiles 145.

Figure 2:
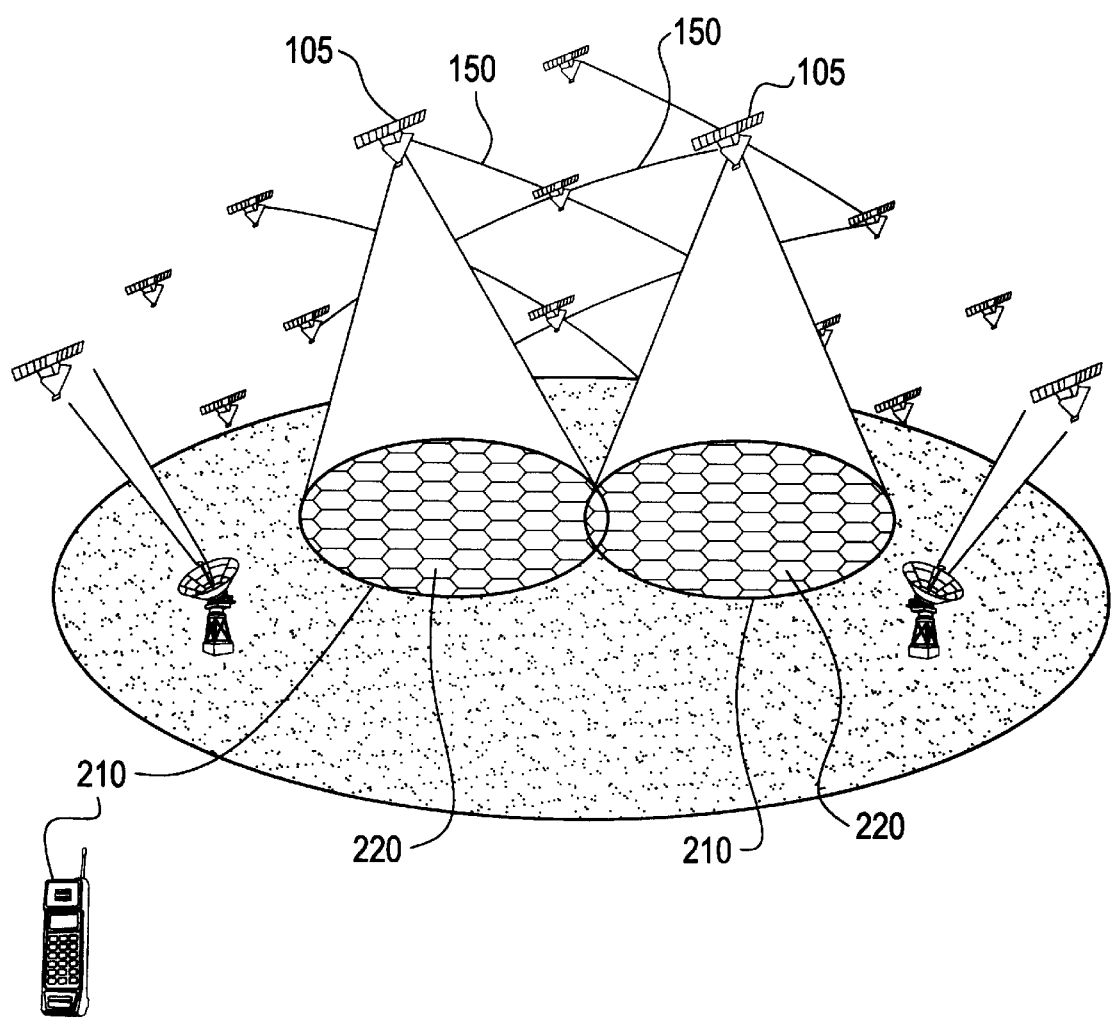
FIG. 2 illustrates satellite footprints of the global telecommunications network of FIG. 1.

The satellites 105 of the system 100 employ intersatellite links 150, or "crosslinks", to communicate directly with each other. These crosslinks 150 provide reliable, high-speed communications between neighboring satellites, allowing call routing and administration to occur efficiently. As illustrated in FIG. 2, each satellite 105 in the constellation has a ground coverage area called a "footprint" 210. The footprint 210 is further divided into smaller areas called "beams" 220. The footprints 210 of the satellites are overlapped to provide maximum coverage.

For a preferred embodiment of the call processing architecture of the system 100, the globe is divided into Location Area Codes (LACs). Each LAC is a service location for the system 100. Each gateway 100 services a certain set of LACs. For example, when a user makes a call from his/her subscriber unit 130 to a particular location, the subscriberkunit 130 first links with satellite 105 which has a beam servicing his/her current LAC. The subscriber unit 130 requests a satellite channel for the call. The request is sent to the gateway 110 which services the caller's LAC. This gateway 110 then initiates the opening of the channel between phone 130 and satellite 105. Once the channel is established, the signal for the phone call is routed through the crosslinks 150 of the satellites 105 to the gateway 110 servicing the LAC of the call's destination. This gateway 110 then sends the call to the PSTN 15 which routes the signal to the particular phone called.

Figure 3:
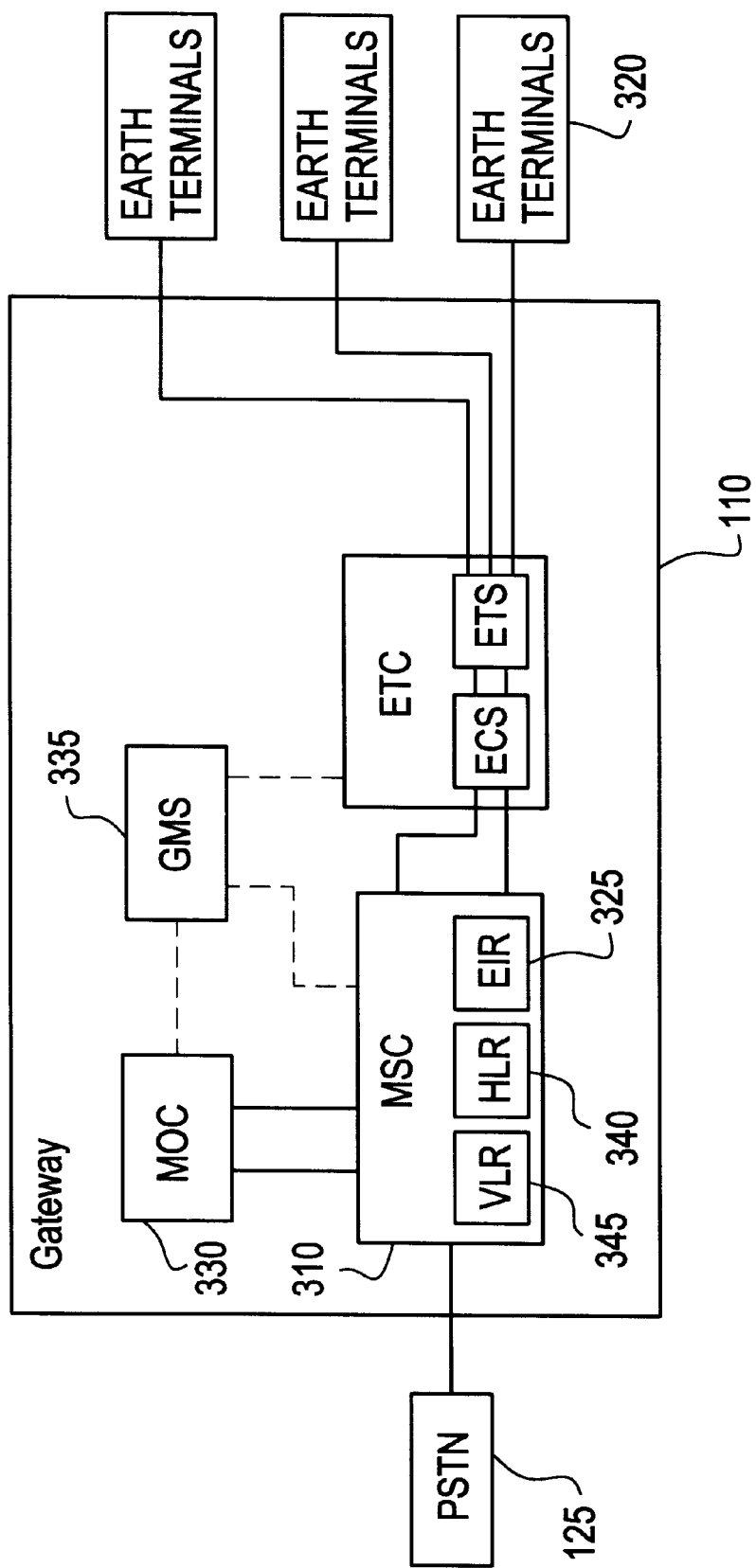
FIG. 3 illustrates a gateway of the global telecommunications network of FIG. 1.

FIG. 3 illustrates in more detail a preferred embodiment of the gateway 110 of the system 100. The heart of the gateway 110 is the Mobile Switching Center 310 (MSC) or the "switch". An example of a switch 310 which may be used is the Siemens GSM-D900 switch. The switch 310 has two "sides": a land side which connects to the local telephone network via the PSTN 315, and a mobile side which connects to Earth Terminal Controllers 320 which communicate with the satellite constellation 105 using K-band radio links. Information for the physical subscriber equipment (subscriber unit 130, pager 135, etc.) is kept in the Equipment Identity Register 325(EIR). The gateway's 110 Message Orientation Controller 330 (mOC) supports a variety of messaging services such as direct messaging to pagers. The Gateway Management System 335 (GMS) provides operations, administration, and maintenance support for each of the gateway subsystems.

In addition to the EIR 325, the switch 330 includes a Home Location Register 340 (HLR) and a Visitor Location Register 345 (VLR). The HLR 340 stores subscriber service information for the "Home Gateway". A Home Gateway is assigned to each subscriber to the system 100 and is related to the LAC at which the subscriber is based. The Home Gateway is responsible for granting system access. Whenever a subscriber places or receives a call, the system 100 will determine the subscriber's location with accuracy sufficient for call control. The Home Gateway will receive and evaluate this location information to determine whether it is permissible for the call to proceed. This feature is essential to help ensure compliance with calling restriction laws in nations where such laws exist. In addition, there is a Visited Gateway which will serve and control the mobile subscriber end of a call. The Visited Gateway temporarily retains a copy of select subscriber information in its VLR 345. This information remains within the Visited Gateway until the subscriber "roams" into a new Visited Gateway territory or until it expires. When a subscriber is at "Home", the Visited Gateway and the Home Gateway are one and the same.

Figure 4:
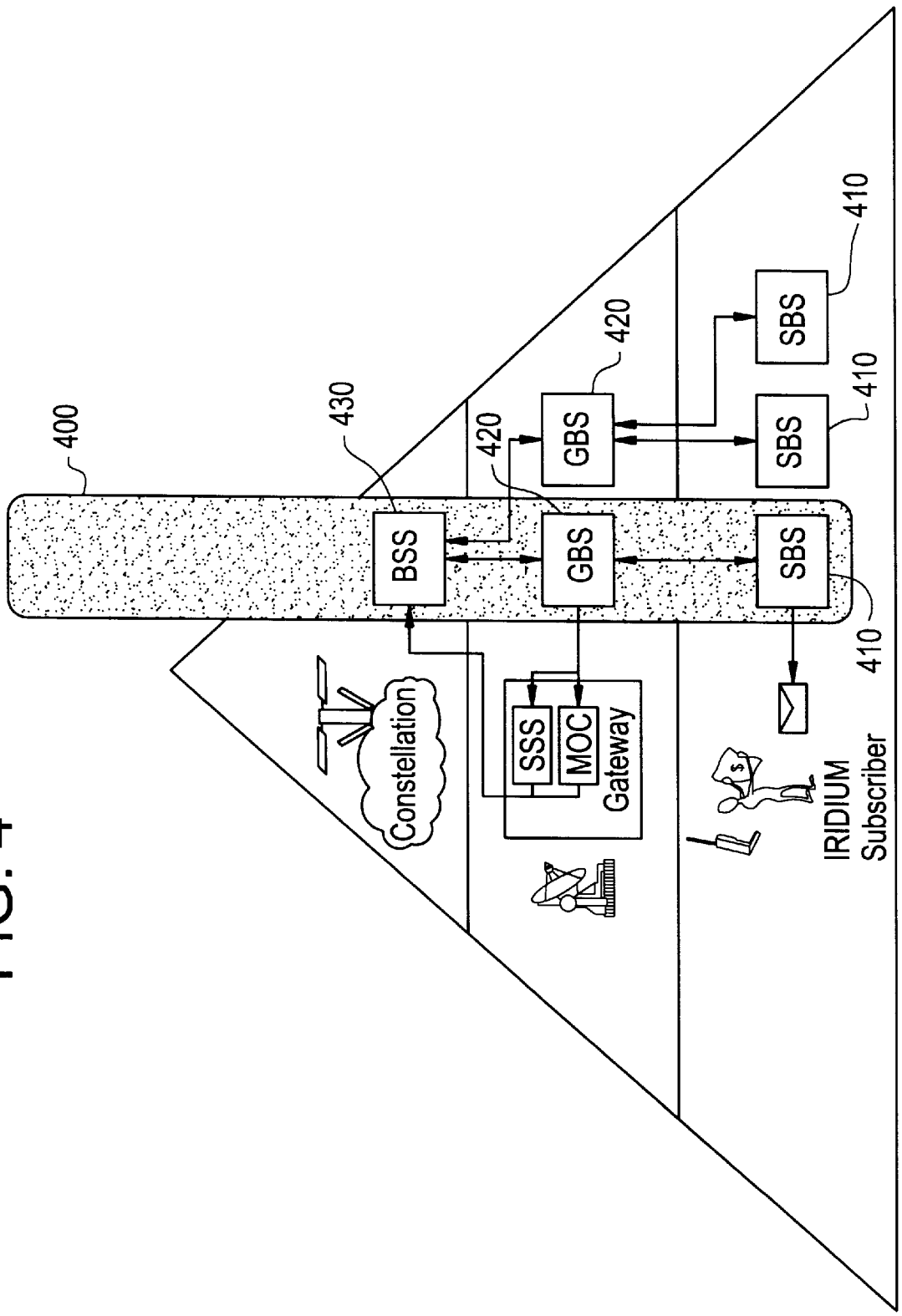
FIG. 4 illustrates a business system for managing the telecommunications network of FIG. 1.

To manage usage information of the system 100, a business system 400 is used. FIG. 4 illustrates a preferred embodiment of a business system 400 which may be used with the present invention. The business system 400 comprises three subsystems: the Service Business System 410 (SBS), the Gateway Business System 420 (GBS), and the Business Support System 430 (BSS).

The SBS 410 includes service providers who sell subscriptions for usage of the telecommunications system 100 directly to the consumer and roaming partners who resells usage of the system 100 and also provide other cellular services in their own systems. SBS 410 functions include pre-sales support, service negotiation, general and billing inquiries, payment remittance, pricing and invoicing, receivables management, and account profile maintenance.

The GBS 420 includes gateways 110 (FIG. 1) of the telecommunications system 100 and their operators. The functions of the GBS 420 includes service activation, Tier II customer support, payment and settlement processing, service provider management, usage collection, and retail rating. These functions are performed in the gateways 110.

The functions of the BSS 430 includes gateway relationship management, financial and treasury management, and usage collection. They also include usage verification, revenue distribution, settlement statement generation, and payable/receivable processing. These functions are managed by a Clearinghouse.

Two popular telecommunications protocols used around the world are the Global System for Mobile (GSM) Communications protocol and the IS-41 protocol. For the network 100 to be truly global, calls originating in one protocol must be able to cross protocol lines to be completed in the other protocol. For example, if a subscriber homed in an IS-41 protocol jurisdiction initiates or terminates a call in a GSM protocol jurisdiction, the network 100 must bridge the gap between the GSM and the IS-41 protocols so that the call may be completed. This is accomplished through an Iridium Interworking Unit (IIU) which resides in one of the gateways in the network 100. One important function of this IIU is the translation of call-related signaling messages from GSM protocols to IS-41 protocols and vice versa. So for the call in the example above, assume a call to the subscriber begins in an IS-41 protocol jurisdiction. The IIU translates routing information for this call from the GSM protocol to the IS-41 protocol and routes it to its destination. In cross-protocol roaming, the IIU is the entity which performs authentication. Authentication is the process in which the subscriber's registration with the network is validated. Each time a subscriber's unit attempts to make a call, the subscriber unit is first authenticated before the call is completed. The IIU also performs other functions, such as emulation of HLRs and VLRs.

Figure 5A:
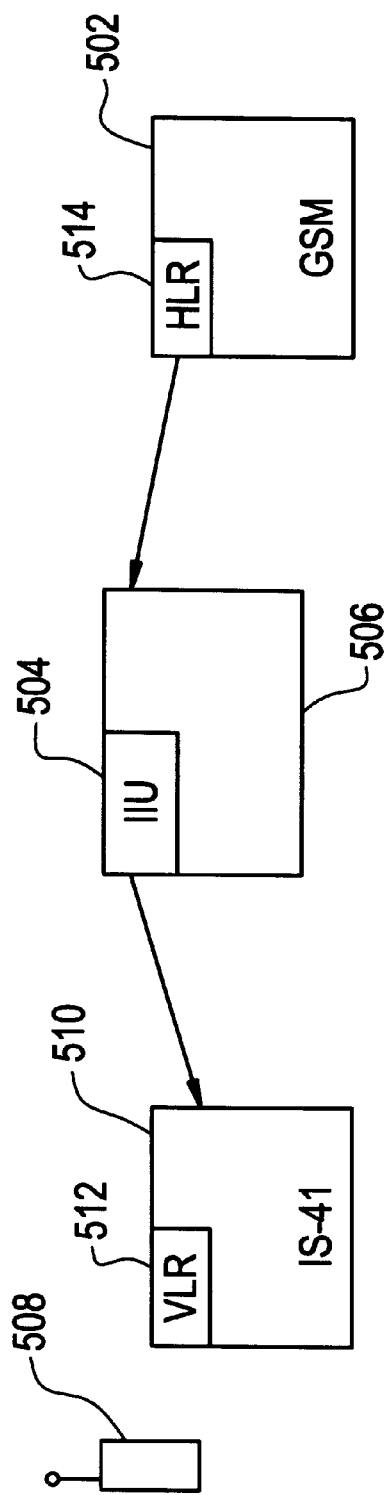
FIGS. 5A and 5B illustrate the completion of cross-protocol calls.
Figure 5B:
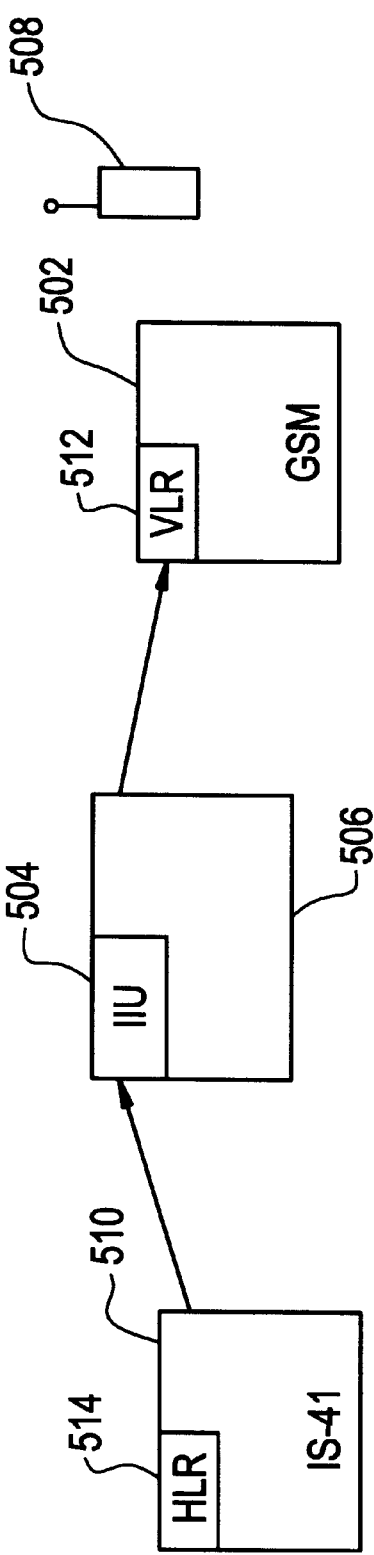

FIGS. 5A and 5B illustrate the completion of cross-protocol calls in the network 100. FIG. 5A illustrates the process when a GSM-homed subscriber 508 is roaming in an IS-41 protocol jurisdiction 510. To deregister a subscriber, an operator's HLR 514 in the GSM protocol jurisdiction 502 sends a deregistration, or Cancel_Location, message to the IIU 504 which resides in gateway 506. The IIU 504 would then cause deregistration of the subscriber in the IS41 VLR 512. However, a problem arises when the Cancel_Location message does not reach the IIU 504 due to congestion or error in message routing or some other problem. FIG. 6 is a message flow diagram which illustrates the loss of the Cancel_Location message.

In typical GSM network operating conditions where no cross-protocol roaming occurs, the loss of the deregistration message does not create a significant problem. During the authentication process, in which the subscriber's identity is validated, a set of authentication codes which contain data used in the authentication algorithm, is used. These authentication codes are stored in the VLR. After five sets of authentication codes are used, the VLR requests five new sets from the home network's HLR. If the subscriber has been deregistered, the HLR will reply with "Unknown Subscriber" instead of sending back the new authentication codes.

However, in the case of cross-protocol roaming, the IIU is the entity that performs authentication. Since the GSM home network is not involved in the authentication process, no triplets are required, and no messaging is required back to the GSM's network's HLR. Thus, the IIU never knows that it should deregister the subscriber if the Cancel_Location message never reaches it. The IIU would allow normal call processing.

As illustrated in FIG. 5B, the same problem arises when an IS-41 homed subscriber is roaming in a GSM protocol jurisdiction. To deregister the subscriber, an operator's HLR 514 in the IS-41 510 protocol jurisdiction sends a deregistration, or Registration_Cancellation, message to the IIU 504. The IIU then would proceed to deregister the subscriber in the GSM 502 VLR. However, a problem arises when the Register_Cancellation message does not reach the IIU 504 due to congestion or error in message routing or some other problem. FIG. 7 is a message flow diagram which illustrates loss of the Registration_Cancellation message.

In typical IS-41 network operating conditions where no cross-protocol roaming occurs, the loss of the deregistration message may last a long time if the visited Public Land Mobile Networks (PLMN) performs authentication. Similar to the GSM case, in the case of cross-protocol roaming, the IIU is the entity that performs authentication. The IIU never knows that it should deregister the subscriber if the Registration_Cancellation message never reaches it. The IIU would allow normal call processing to occur.

Figure 8:
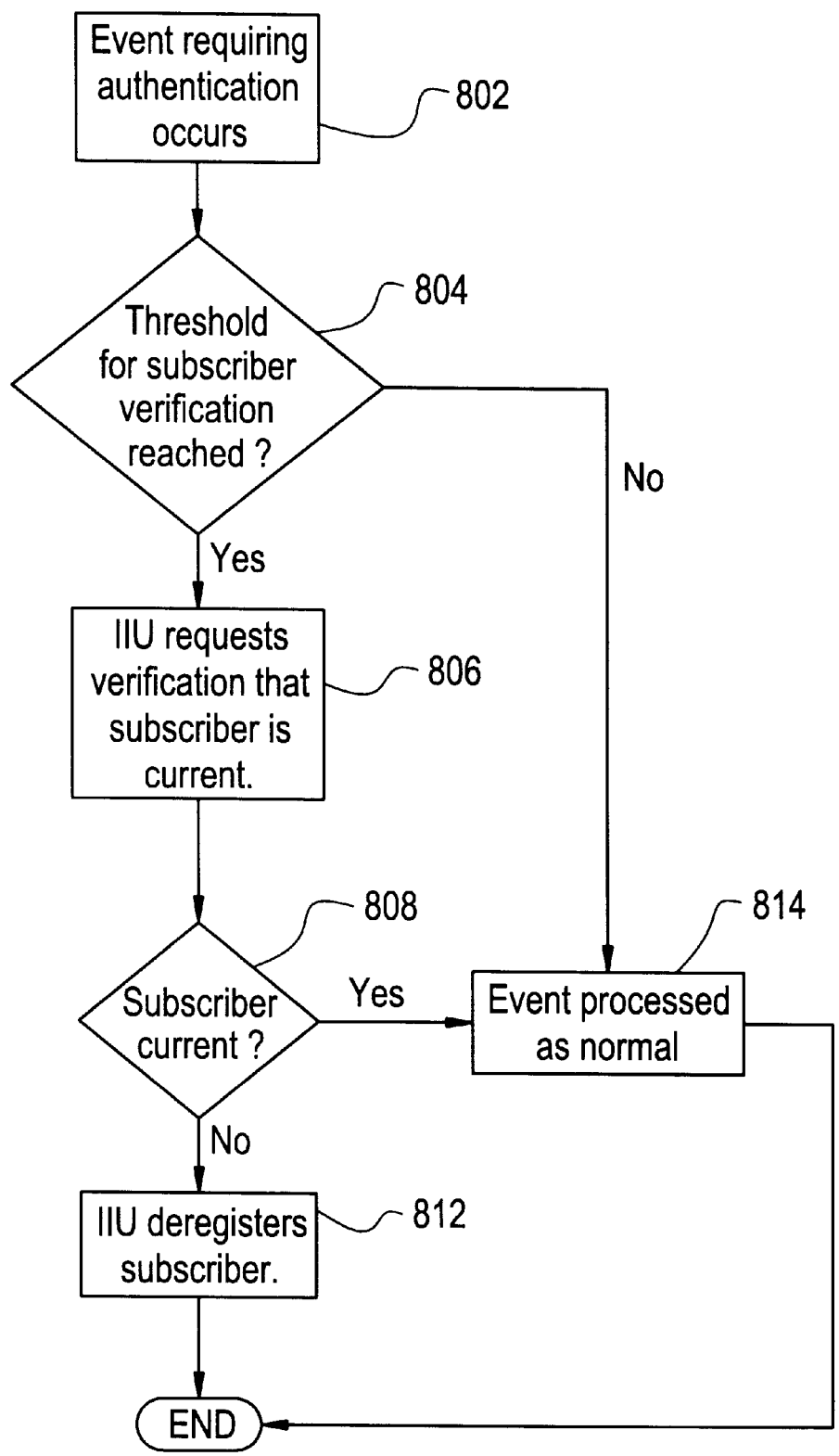
FIG. 8 is a flow chart illustrating the preferred embodiment of a reregistration process in accordance with the present invention.

To solve this problem, the present invention takes advantage of the authentication process in the IIU 504. FIG. 8 is a flow chart illustrating a preferred embodiment of a reregistration process in accordance with the present invention. First, an event requiring authentication occurs, such as a cross-protocol call to or from the subscriber, via step 802. It is then determined if the threshold for subscriber verification has been reached, via step 804. In the preferred embodiment, the threshold is five authentication attempts for a particular subscriber; however, any threshold may be used. If not, then the event is processed normally, via step 814. If the threshold has been reached, then the IIU requests verification that the subscriber is current, via step 806. If it is determined that the subscriber is current, via step 808, then the event is processed normally, via step 814. If the subscriber is determined not to be current, via step 808, then the HU deregisters the subscriber, via step 812.

Figure 9A:
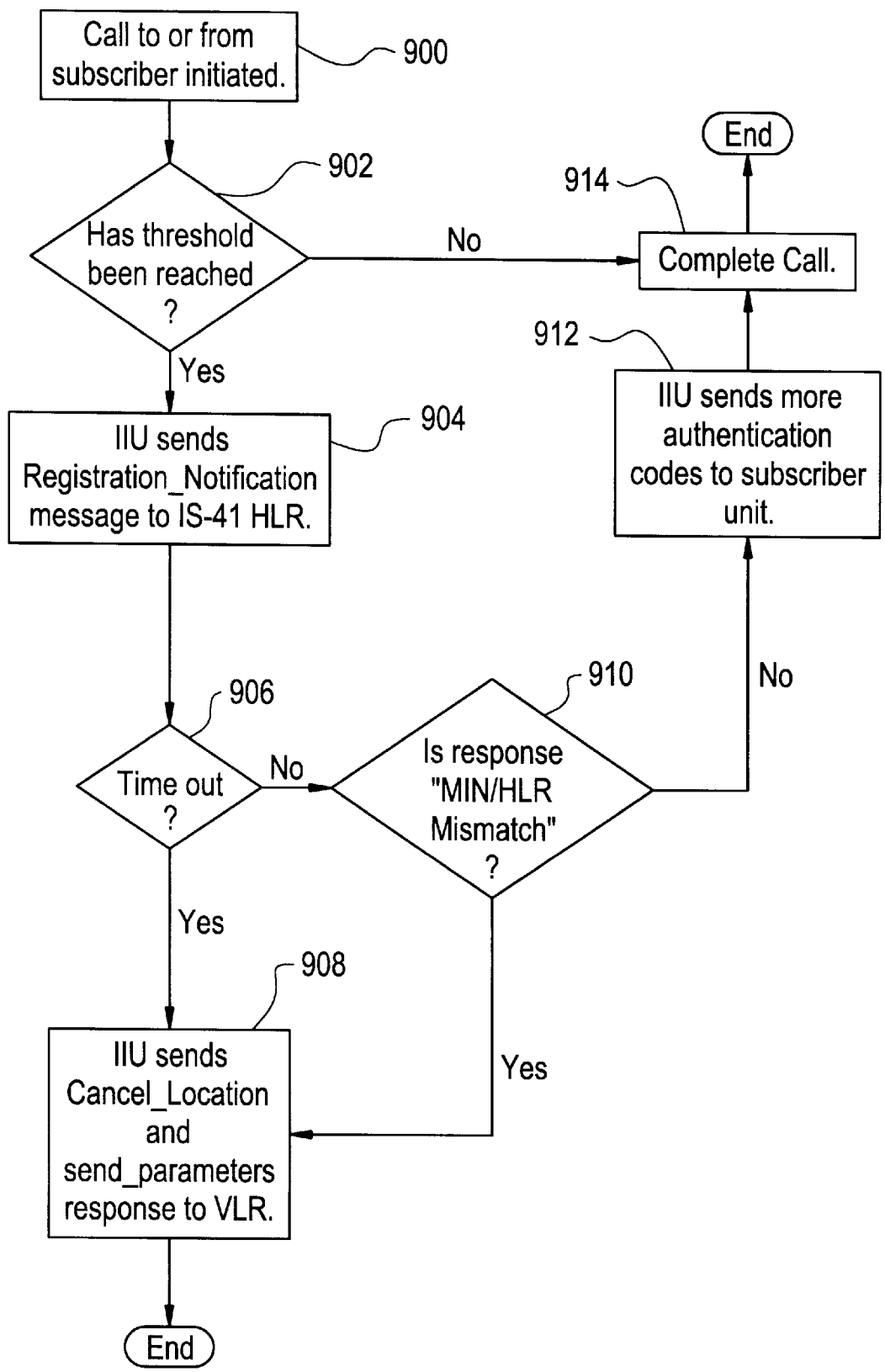
FIG. 9A is a flow chart illustrating in more detail the preferred embodiment of a reregistration process in the GSM protocol in accordance with the present invention.
Figure 10:
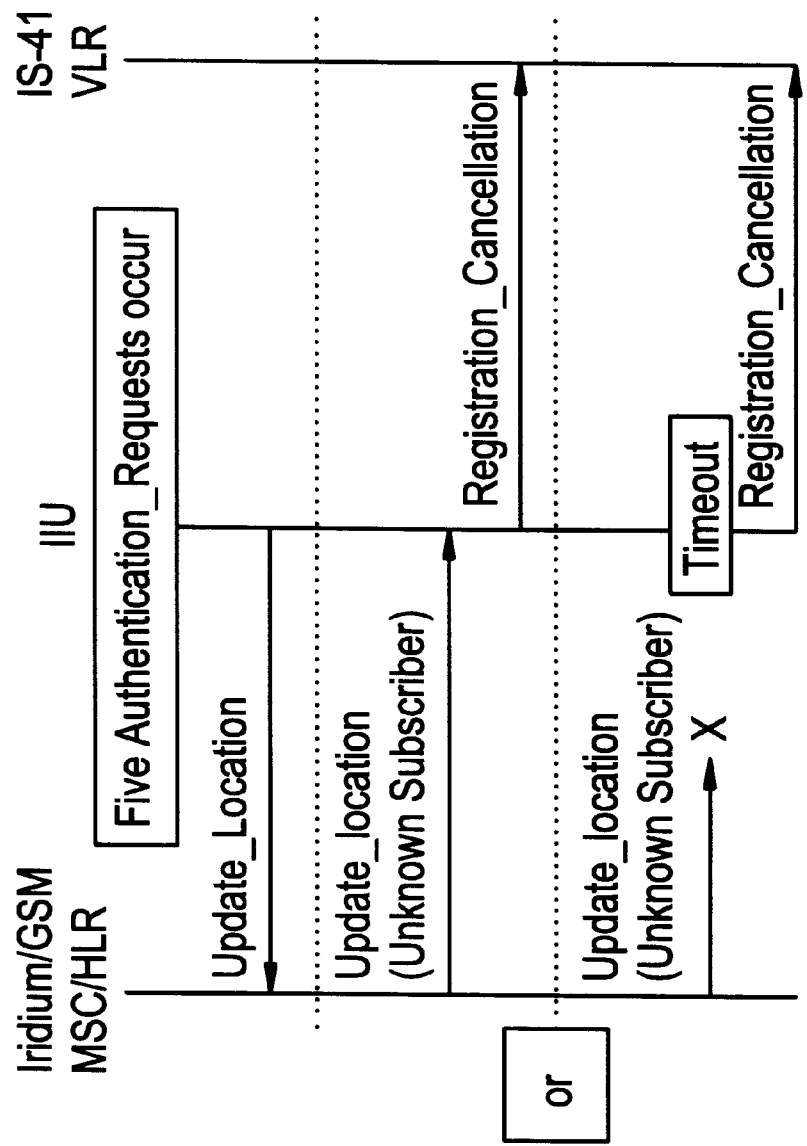
FIG. 10 is a message flow diagram for the reregistration of a GSM-homed subscriber in accordance with the present invention.

FIG. 9A is a flow chart illustrating in more detail the preferred embodiment of the reregistration process for an IS-41 subscriber roaming in the GSM protocol in accordance with the present invention. Firs, an event requiring authentication occurs, such as a call to or from a subscriber, via step 900. Then, it is determined if the threshold for subscribe verification has been reached, via step 902. If not, then the event is processed normally, via step 914. If the threshold has been reached, then the IIU sends a "Registration_Notification" message to the IS-41 HLR, via step 904. The IIU waits for a response. If a response is received, i.e., the IIU request did not time out, via step 906, the IIU determines if the response was a "MIN/HLR Mismatch", via step 910. If not, then the IIU sends more authentication codes to the Iridium/GSM VLR, via step 912, and the event is then processed normally, via step 914. If the response is "MIN/HLR Mismathc", or if the IIU request times out, then the IIU sends a "Cancel_Location" and "send_parameters" response to the Iridium/GSM VLR, via 908. FIG. 10 is a message flow diagram which illustrates reregistration process for GSM homed subscriber in accordance with the present invention.

Figure 9B:
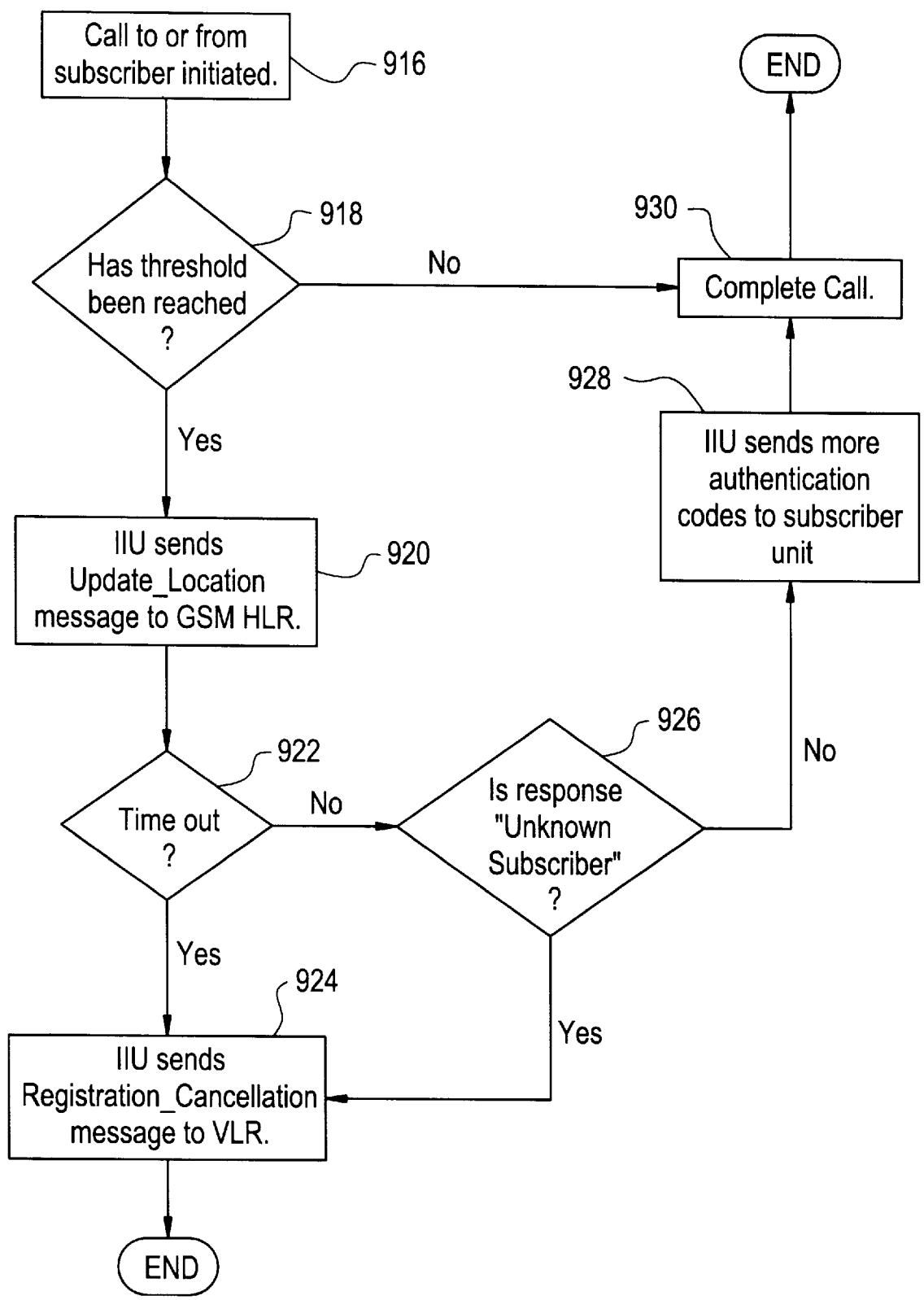
FIG. 9B is a flow chart illustrating in more detail the preferred embodiment of a reregistration process in the IS-41 protocol in accordance with the present invention.

FIG. 9B is a flow chart illustrating in more detail the preferred embodiment of the reregistration process for an Iridium/GSM subscriber roaming in the IS-41 protocol in accordance with the present invention. First, an event requiring authentication occurs, such as a call to or from a subscriber, via step 916. Then, it is determined if the threshold for subscriber verification has been reached, via step 918. If not, then the event is processed normally, via step 930. If the threshold has been reached, then the IIU sends an "Update_Location" message to the Iridium/;GSM HLR, via step 920. The IIU waits for a response. If a response is received, i.e., the IIU request did not time out, via step 922, then the IIU determines if the response was "Unknown Subscriber", via step 926. If not, then IIU completes the authentication process, via step 928, and the event is then processed normally, via step 930. If the response is "Unknown Subscriber", or if the IIU request times out, then the IIU sends a "Registration_Cancellation" message to the IS-41 VLR, via step 924. FIG. 11 is a message flow diagram for the reregistration process for an IS-41 homed subscriber in accordance with the present invention.

Thus, even if a deregistration message does not reach the VLR, the subscriber will lose access to the network once the threshold for subscriber verification has been reached, since the subscriber unit is then forced to contact the home network's HLR to retrieve more authentication codes through the IIU. This contact between the IIU and the HLR allows the HLR to inform the VLR of the deregistration of the subscriber.

A method for proper deregistration of a network subscriber in a global telecommunications network for cross-protocol calls has been disclosed. The method of the present invention prevents continued access to the network by deregistered subscribers for cross-protocol calls when deregistration messages are lost. In this manner, fraudulent use of the network by unauthorized users are decreased.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for reregistration of a subscriber unit in a global telecommunications network, comprising the steps of:

(a) receiving an event requiring authentication;

(b) determining if a threshold for subscriber verification has been reached;

(c) requesting subscriber verification if the threshold has been reached; and (d) deregistering the subscriber if the subscriber is not verified; wherein the deregistering step (d) comprises: (d1) determining if the verification request timed-out; (d2) determining if an Update_Location message containing an Unknown Subscriber parameter is received in response to the verification request; (d3) sending a Registration_Cancellation message to a visited network's visited location register (VLR) if either the request timed-out or an Update_Location message containing an Unknown Subscriber parameter is received; and (d4) processing the event as normal if the Unknown Subscriber message is not received.

2. The method of claim 1, wherein the requesting step (c) comprises:

(c1) sending an Update_Location message to a home network's home location register (HLR).

3. The method of claim 1, wherein the requesting step (c) comprises;
(c2) sending a Registration_Notification message to a home network's HLR.

4. A system for reregistration of a subscriber unit in a global telecommunications network, comprising:
means for receiving an event requiring authentication;
means for determining if a threshold for subscriber verification has been reached;
means for requesting subscriber verification if the threshold has been reached; and
means for deregistering the subscriber if the subscriber is not verified; wherein the deregistering means comprises: means for determining if the verification request timed-out; means for determining if an Update_Location message containing and Unknown Subscriber parameter is received in response to the verification request; means for sending a Registration_Cancellation message to a visited network's VLR if either the request timed-out or an Update_Location message containing an Unknown subscriber parameter is received; and means for processing the event as normal if the Update_Location message containing the Unknown Subscriber parameter is not received.

5. The system of claim 4, wherein the requesting means comprises:
means for sending an Update_Location message to a home network's HLR.

6. The system of claim 4, wherein the requesting means comprises:
means for sending a Registration_Notification message to a home network's HLR.

7. A method for registration of a subscriber unit in a global telecommunications network, comprising the steps of:
(a) receiving an event requiring authentication;
(b) determining if a threshold for subscriber verification has been reached;
(c) requesting subscriber verification by sending an Update_Location message to a home network's HLR if the threshold has been reached;
(d) determining if a response to the Update_Location message verifies the subscriber; and
(e) deregistering the subscriber if the subscriber is not verified; wherein the deregistering step (e) comprises: (e1) determining if the verification request timed-out; (e2) determining if an Update_Location message containing an Unknown Subscriber parameter is received in response to Update_Location message; (e3) sending a registration_Cancellation message to a visited network's VLR if either the request timed-out or the Update_Location message containing the Unknowns Subscriber parameter is received; and (e4) processing the event as normal if the Update_Location message containing the Unknown Subscriber parameter is not received.

8. A method for reregistration of a subscriber unit in a global telecommunications network, comprising the steps of:
(a) receiving an event requiring authentication;
(b) determining if a threshold for subscriber verification has been reached;
(c) requesting subscriber verification by sending a Registration_Notification message to a home network's HLR if the threshold has been reached;
(d) determining if a response to the Registration_Notification message verifies the subscriber; and
(e) deregistering the subscriber if the subscriber is not verified; wherein the detegistering step (e) comprises: (e1) determining if the verification request timed-out; (e2) determining if a Registration_Cancellation message containing a MIN/HLR Mismatch parameter is received in response to the Registration_Notification messag; (e3) sending a cancel_Location and send_parameters message to a visited network's VLR if either the request timed-out or a Registration_Cancellation message containing a MIN/HLR Mismatch parameter is received; and (e4) completing authentication and processing the event as normal if the Registration_Cancellation message containing the MIN/HLR Mismatch parameter is not received.

9. A system for reregisteration of a subscriber unit in a global telecommunications network, comprising:
means for receiving an event requiring authentication;
means for determining if a threshold for subscriber verification has been reached;
means for requesting subscriber verification by sending an Update_Location message to a home network's HLR if the threshold has been reached;
means for determining if a response to the Update_Location message verifies the subscriber; and
means for deregistering the subscriber if the subscriber is not verified; wherein the deregistering means comprises: means for determining if the verification request timed-out; means for determining if an Update_Location message containing and Unknown Subscriber parameter is received in response to Update_Location message; means for sending a Registration_Cancellation message to a visited network's VLR if either the request timed-out or the Update_Location message containing the Unknown subscriber parameter is received; and means for processing the event as normal if the Update_Location message containing the Unknown Subscriber parameter is not received.

10. A system for reregistration of a subscriber unit in a global telecommunications network, comprising:
means for receiving an event requiring authentication;
means for determining if a threshold for subscriber verification has been reached;
means for requesting subscriber verification by sending a Registration_Notification message to a home network's HLR if the threshold has been reached;
means for determining if a response to the Registration_Notification message verifies the subscriber; and
means for deregistering the subscriber if the subscriber is not verified; wherein the deregistering means comprises: means for determining if the verification request timed-out; means for determining if a Registration_Cancellation message containing a MIN/HLR Mismatch parameter is received in response to the Registration_Notification message; means for sending a Cancel_Location and send_parameters message to a visited network's VLR if either the request timed-out or a Registration_Cancellation message containing a MIN/HLR Mismatch parameter is received; and means for completing authentication and processing the event as normal if the Registration_Cancellation message containing the MIN/HLR Mismatch parameter is not received.

11. A method for reregistration of a subscriber unit in a global telecommunications network, comprising the steps of:

(a) receiving an event requiring authentication;
(b) determining if a threshold for subscriber verification has been reached;
(c) requesting subscriber verification by sending an Update_Location message to a home network's HLR if the threshold has been reached;
(d) determining if a response to the Update_Location message verifies the subscriber;
(e) determining if the verification request timed-out;
(f) determining if an Update_Location message containing an Unknown Subscriber parameter is received in response to Update_Location message;
(g) sending a Registration_Cancellation message to a visited network's VLR if either the request timed-out or the Update_Location message containing the Unknown Subscriber parameter is received; and
(h) processing the event as normal if the Update_Location message containing the Unknown Subscriber parameter is not received.

12. A method for reregistration of a subscriber unit in a global telecommunications network, comprising the steps of:
(a) receiving an event requiring authentication;
(b) determining if a threshold for subscriber verification has been reached;
(c) requesting subscriber verification by sending a Registration_Notification message to a home network's HLR if the threshold has been reached;
(d) determining if a response to the Registration_Notification message verifies the subscriber;
(e) deregistering the subscriber if the subscriber is not verified;
(f) determining if the verification request timed-out;
(g) determining if a Registration_Cancellation message containing a MIN/HLR Mismatch parameter is received in response to the Registration_Notification message;
(h) sending a Cancel_Location and send_parameters message to a visited network's VLR if either the request timed-out or a Registration_Cancellation message containing a MIN/HLR Mismatch parameter is received; and
(i) completing authentication and processing the event as normal if the Registration_Cancellation message containing the MIN/HLR Mismatch parameter is not received.

13. A system for reregistration of a subscriber unit in a global telecommunications network, comprising:
means for receiving an event requiring authentication;
means for determining if a threshold for subscriber verification has been reached;
means for requesting subscriber verification by sending an Update_Location message to a home network's HLR if the threshold has been reached;
means for determining if a response to the Update_Location message verifies the subscriber;
means for determining if the verification request timed-out;
means for determining if an Update_Location message containing an Unknown Subscriber parameter is received in response to Update_Location message;
means for sending a Registration_Cancellation message to a visited network's VLR if either the request timed-out or the Update_Location message containing the Unknown Subscriber parameter is received; and
means for processing the event as normal if the Update_Location message containing the Unknown Subscriber parameter is not received.

14. A system for reregistration of a subscriber unit in a global telecommunications network, comprising:
means for receiving an event requiring authentication;
means for determining if a threshold for subscriber verification has been reached;
means for requesting subscriber verification by sending a Registration_Notification message to a home network's HLR if the threshold has been reached;
means for determining if a response to the Registration_Notification message verifies the subscriber;
means for deregistering the subscriber if the subscriber is not verified;
means for determining if the verification request timed-out;
means for determining if a Registration_Cancellation message containing a MIN/HLR Mismatch parameter is received in response to the Registration_Notification message;
means for sending a Cancel_Location and send_parameters message to a visited network's VLR if either the request timed-out or a Registration_Cancellation message containing a MIN/HLR Mismatch parameter is received; and
means for completing authentication and processing the event as normal if the Registration_Cancellation message containing the MIN/HLR Mismatch parameter is not received.

15. A method for reregistration of a subscriber unit in a global telecommunications network, comprising the steps of:
(a) receiving an event requiring authentication;
(b) determining if a threshold for subscriber verification has been reached;
(c) requesting subscriber verification if the threshold has been reached; and
(d) deregistering the subscriber if the subscriber is not verified; wherein the deregistering step (d) comprises:
(d1) determining if the verification request timed-out;
(d2) determining if a Registration_Cancellation message containing a MIN/HLR Mismatch parameter is received in response to the verification request; (d3) sending a Cancel_Location and send_parameters message to a visited network's VLR if either the request timed-out or a Registration_Cancellation message containing a MIN/HLR Mismatch parameter is received; and (d4) completing authentication and processing the event as normal if the MIN/HLR Mismatch message is not received.

16. A system for reregistration of a subscriber unit in a global telecommunications network, comprising:
means for receiving an event requiring authentication;
means for determining if a threshold for subscriber verification has been reached;
means for requesting subscriber verification if the threshold has been reached; and
means for deregistering the subscriber if the subscriber is not verified; wherein the deregistering means comprises:
means for determining if the verification request timed-out;

means for determining if a Registration_Cancellation message containing a MIN/HLR Mismatch parameter is received in response to the verification request;

means for sending a Cancel_Location and send_parameters message to a visited network's VLR if either the request timed-out or a Registration_Cancellation message containing a MIN/HLR Mismatch parameter is received; and means for completing authentication and processing the event as normal if the Registration_Cancellation message containing the MIN/HLR Mismatch parameter is not received.

17. A computer readable medium containing program instructions for reregistration of a subscriber unit in a global telecommunications network, the program instructions for:

(a) receiving an event requiring authentication;

(b) determining if a threshold for subscriber verification has been reached;

(c) requesting subscriber verification if the threshold has been reached; and (d) deregistering the subscriber if the subscriber is not verified; wherein the deregistering step (d) comprises: (d1) determining if the verification request timed-out; (d2) determining if an Update_Location message containing an Unknown Subscriber parameter is received in response to the verification request; (d3) sending a Registration_Cancellation message to a visited network's visited location register (VLR) if either the request timed-out or an Update_Location message containing an Unknown Subscriber parameter is received; and (d4) processing the event as normal if the Unknown Subscriber message is not received.

* * * * *